US005586827A

United States Patent [19]
Unno et al.

[11] Patent Number: 5,586,827
[45] Date of Patent: Dec. 24, 1996

[54] BALL BEARING WITH CONTROLLED DYNAMIC IMBALANCE

[75] Inventors: Tetsuo Unno; Yoshio Shoda; Tatsunobu Momono, all of Fujisawa, Japan

[73] Assignee: NSK Ltd., Tokyo, Japan

[21] Appl. No.: 583,398

[22] Filed: Jan. 5, 1996

[30] Foreign Application Priority Data

Jan. 6, 1995 [JP] Japan ................................. 7-000463

[51] Int. Cl.$^6$ ................................................. F16C 19/00
[52] U.S. Cl. ................................................. 384/450
[58] Field of Search ................................. 384/445, 450, 384/456, 492, 627

[56] References Cited

FOREIGN PATENT DOCUMENTS 49-27309  7/1974  Japan .
62-297740  12/1987  Japan .

*Primary Examiner*—Thomas R. Hannon
*Attorney, Agent, or Firm*—Helfgott & Karas, PC.

[57] ABSTRACT

1. A ball bearing comprising; a first race ring having a surface formed with a first race surface thereon, a second race ring having a surface formed with a second race surface thereon, and a plurality of balls provided so as to be freely rotatable between the first race surface and the second race surface, the ball bearing being used under conditions wherein a product $d_m \cdot N$ of a pitch circle diameter $d_m$ mm of the plurality of balls, and a rotational speed N rpm of the second race ring relative to the first race ring is greater than 1,000,000 mm·rpm, characterized in that for each of the plurality of balls, a ratio $\Delta I/I$ of a dynamic imbalance amount to a moment of inertia I, is less than $(3.1 \times 10^7/(d_m \cdot N)^2) + 2.7 \times 10^{-5}$.

1 Claim, 4 Drawing Sheets 5,586,827

BALL BEARING WITH CONTROLLED DYNAMIC IMBALANCE

BACKGROUND OF THE INVENTION

1. Field of the Invention

The present invention is related to a ball bearing for rotationally supporting various types of mechanical equipment such as gas turbines, specifically for supporting main shafts and the like rotating at high speeds. Moreover, the ball bearings to which the present invention is addressed, include all types of radial ball bearings such as deep groove type and angular type, as well as thrust ball bearings.

2. Description of the Related Art

In order to support various types of rotating members such as the main shaft of a gas turbine, a ball bearing 1 such as shown in FIGS. 1-2 is widely used. This ball bearing 1 comprises a first race ring or inner ring 3 having a first surface or outer peripheral surface formed with a first race surface or inner ring raceway 2 thereon, a second race ring or outer ring 5 having a second surface or inner peripheral surface formed with a second race surface or outer ring raceway 4 thereon, and a plurality of balls 6 provided so as to be freely rotatable between the inner ring raceway 2 and the outer ring raceway 4. The plurality of balls 6 are retained so as to be freely rotatable by an annular retainer or cage 7, with circumferentially adjacent balls 6 spaced apart thereby.

With such a ball bearing 1, the inner ring 3 is externally secured for example to the main shaft (not shown) of a gas turbine, while the outer ring 5 is internally fitted into a housing (not shown), thereby supporting the main shaft so as to be freely rotatable within the housing. There has heretofore been little consideration particularly with regards to the imbalance (dynamic imbalance) in the balls 6 of the ball bearing 1 of this construction. In other words, the manufactured balls 6 are assembled between the inner ring raceway 2 and the outer ring raceway 4 without any special measurements being made for imbalance.

When the ball bearing 1 is used to support a rotating member rotating at a high rotational speed, imbalance of the balls 6 cannot be disregarded since the presence of any imbalance can cause damage to the balls. That is to say, according to research carried out by the present inventors, in the case of a ball bearing 1 used under conditions wherein the product $d_m \cdot N$ of the pitch circle diameter $d_m$ mm of the balls 6 and the rotational speed N rpm of the inner ring 2 relative to the outer ring 5 is greater than 1,000,000 mm·rpm, then there is the likelihood of damage due to this imbalance.

The reason that such a ball bearing 1 incorporating balls 6 having an imbalance, is susceptible to damage at high rotational speeds, is considered to be due to the following.

When the balls 6 rotate at high speed during high speed use of the ball bearing 1, if there is a dynamic imbalance $\Delta I$ in the balls 6, the locus of the rotation axis of the balls 6 becomes fixed. Specifically, although the balls are rotating, their rotation axis is always the same. Consequently, the rolling face of the balls 6 always contacts the inner ring raceway 2 and the outer ring raceway 4 over the same narrow strip portion. As a result, this contact area in the strip portion reaches its fatigue life at an early stage, becoming susceptible to damage. Moreover, if the balls 6 also have static imbalance, then since there will always be dynamic imbalance caused by the static imbalance, the rotational axis of the balls 6 will become fixed, with the likelihood of damage for the same reasons as above.

SUMMARY OF THE INVENTION

The ball bearing according to the present invention has been developed in view of such a situation as mentioned above.

An object of the present invention is to provide a ball bearing comprising a first race ring having a first surface formed with a first race surface thereon, a second race ring having a second surface formed with a second race surface thereon, and a plurality of balls provided so as to be freely rotatable between the first race surface and the second race surface, such that each of the plurality of balls satisfies the numerical limitations that a ratio $\Delta I/I$ of a dynamic imbalance amount to a moment of inertia I, is less than $(3.1 \times 10^7/(d_m \cdot N)^2) + 2.7 \times 10^{-5}$, when the ball bearing is used under conditions wherein a product $d_m \cdot N$ of a pitch circle diameter $d_m$ mm of the plurality of balls, and a rotational speed N rpm of the second race ring relative to the first race ring is greater than 1,000,000 mm·rpm.

DETAILED DESCRIPTION OF THE PREFERRED EMBODIMENTS

Figure 1:
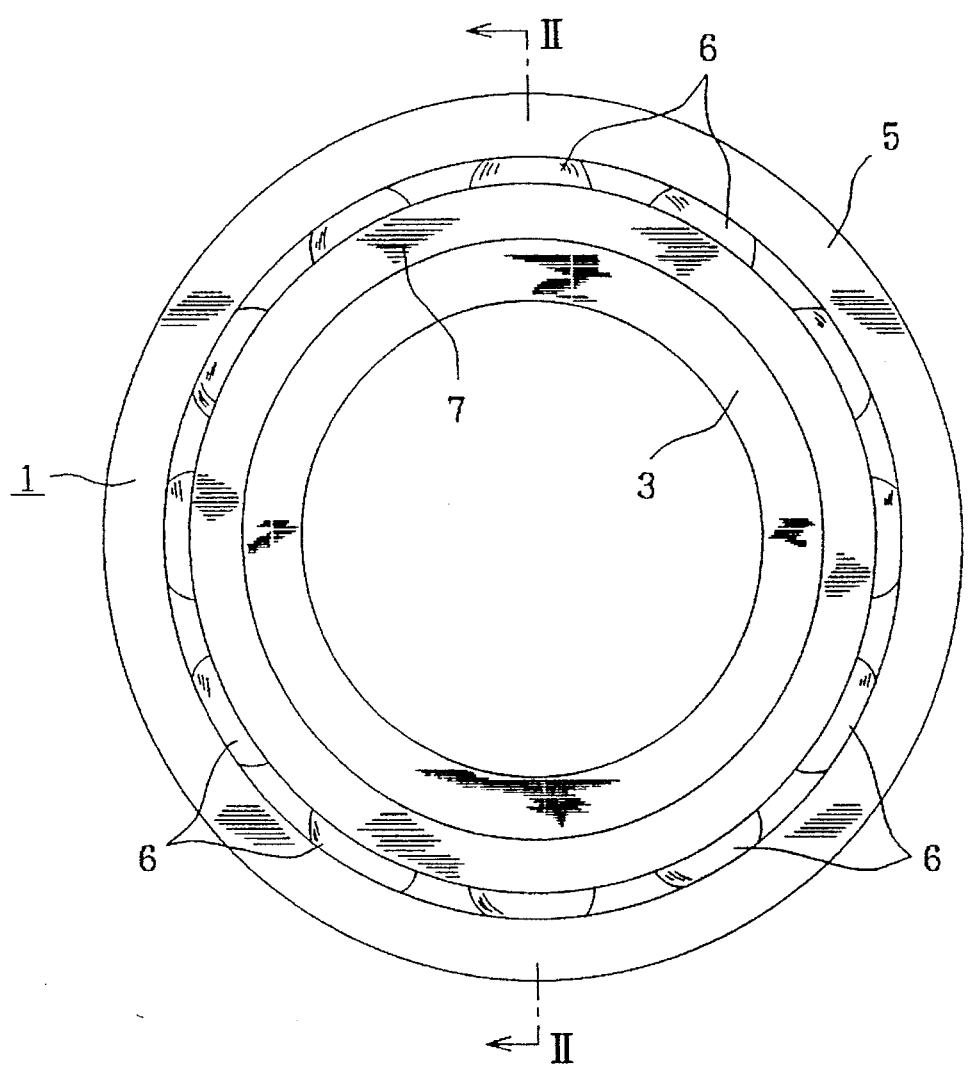
FIG. 1 is an elevational view showing one example of a ball bearing to which the present invention is addressed.
Figure 2:
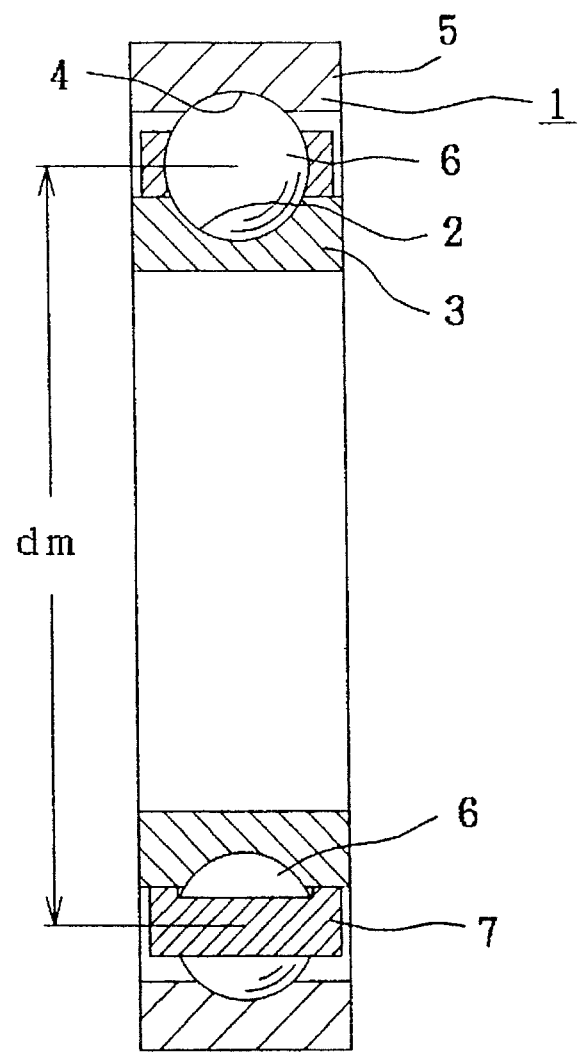
FIG. 2 is a cross-sectional view on II—II of FIG. 1.

The ball bearing according to the present invention, as with the ball bearing of the beforementioned prior art comprises; a first race ring having a first surface formed with a first race surface thereon, a second race ring having a second surface formed with a second race surface thereon, and a plurality of balls provided so as to be freely rotatable between the first race surface and the second race surface. Moreover, the ball bearing is used under conditions wherein the product $d_m \cdot N$ of a pitch circle diameter $d_m$ mm of the plurality of balls and a rotational speed N rpm of the second race ring relative to the first race ring is greater than 1,000,000 mm·rpm.

In particular, with the ball bearing according to the present invention, for each of the plurality of balls, a ratio $\Delta I/I$ of a dynamic imbalance amount $\Delta I$ to a moment of inertia I, is less than $(3.1 \times 10^7/(d_m \cdot N)^2) + 2.7 \times 10^{-5}$.

In the above equation, when determining $\Delta I/I$, then $d_m \cdot N$ can be substituted with no dimension.

In the case of the ball bearing according to the present invention constructed as described above, since the dynamic imbalance amount $\Delta I$ which is the main cause of the rotation axis of the balls becoming fixed, is specified to be less than a small predetermined value, then the likelihood of the rotation axis of the balls becoming fixed is minimal. As a result, the portions of the ball contacting with the first race surface and the second race surface are always changing over the rolling face of the ball, thus preventing the situation where a specific thin strip portion becomes damaged at an early stage. The first and second race surfaces can be outer and inner ring raceways, respectively.

The present invention will now be described in more detail with reference FIGS. 1 to 4.

To obtain the ball bearing 1 according to the present invention, the dynamic imbalance amount ΔI of each ball 6 is measured beforehand for all of the balls 6. The measurement method may involve various types of well known methods such as described subsequently.

The reason for minimizing the dynamic imbalance amount ΔI will be explained with reference to FIG. 3 which shows a representative diagram of a ball 6.

Two negative material points 8 are assumed to lie equidistant from a geometrical center O of the ball 6 and on an X-axis passing therethrough. Since these two negative material points 8 lie on the X-axis at equally spaced locations on either side of the geometrical center O, then there is no static imbalance due to their presence, that is an eccentric distance of center of gravity e is zero. However, a moment of inertia $I_X$ of the negative material points 8 about the X-axis is greater than moments of inertia $I_Y$, $I_Z$ about the other axes (Y-axis and Z-axis. The X, Y and Z-axes are all perpendicular relative to each other). That is to say, $I_X > I_Y = I_Z$. Consequently, when such balls 6 rotate at high speed, the rotation axis becomes fixed on the X-axis.

Figure 3:
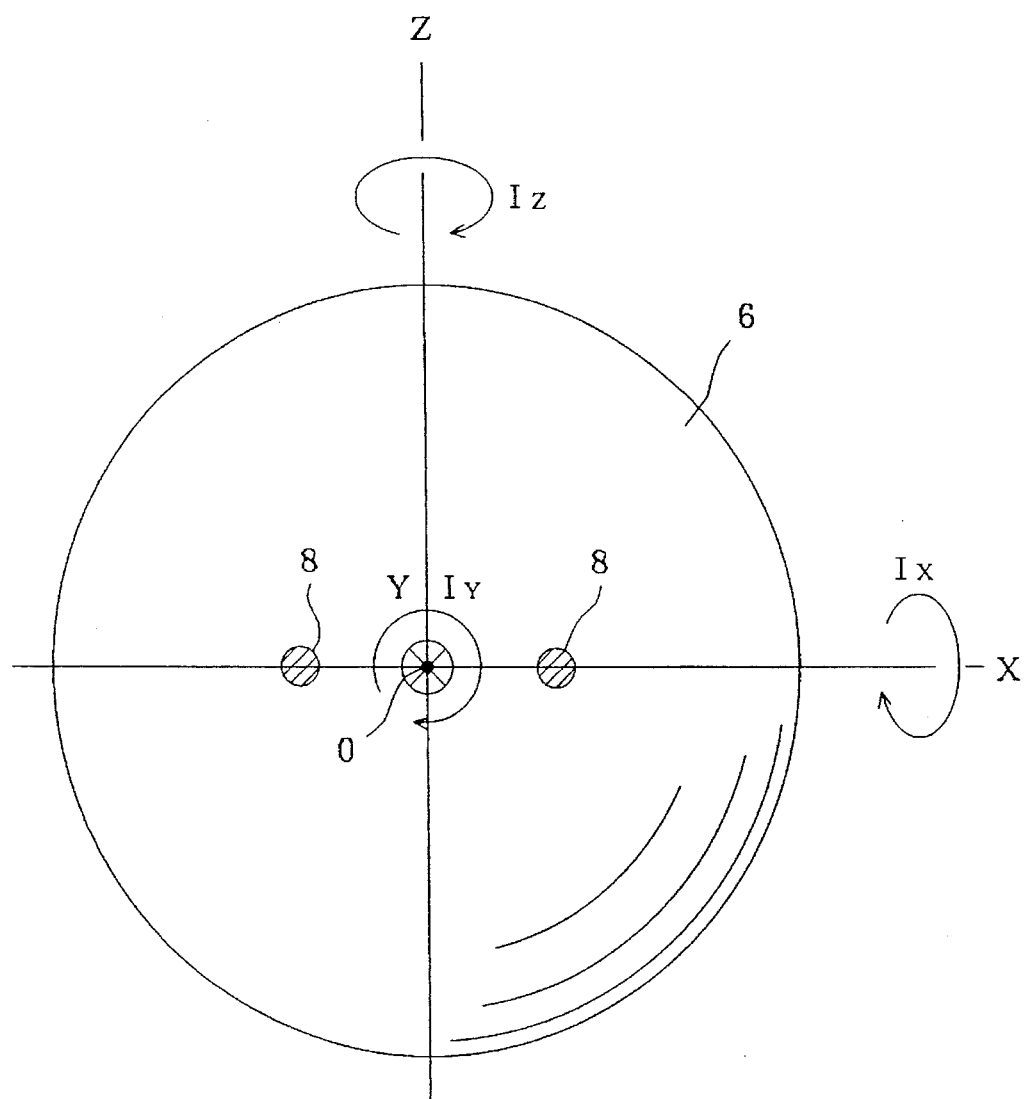
FIG. 3 is a representative diagram of a ball for explaining ball imbalance.

The dynamic imbalance amount ΔI as illustrated by FIG. 3, is expressed as the difference between the moments of inertia $I_Y$ and $I_Z$ about the respective Y-axis and Z-axis, and the moment of inertia $I_X$ about the X-axis ($\Delta I = |I_Y - I_X| = |I_Z - I_X|$).

As will be apparent from FIG. 3, in order to prevent the rotation axis from becoming fixed when the balls 6 rotate at a high speed, it is necessary for the two negative material points 8 to approach the geometrical center O, specifically ideally to coincide with the geometrical center O, so that the differences between the moments of inertia $I_X$, $I_Y$, and $I_Z$ about the respective axes X, Y and Z, in relation to the absolute values of the moments of inertia, becomes small. In other words, $|I_Y - I_X|/I_Y$, $|I_Y - I_Z|/I_Y$, $|I_X - I_Y|/I_X$, $|I_X - I_Z|/I_X$, $|I_Z - I_Y|/I_Z$, $|I_Z - I_X|/I_Z$, are all controlled to less than a small predetermined value, namely $(3.1 \times 10^7/(d_m \cdot N)^2) + 2.7 \times 10^{-5}$.

If in this way, the ratio ΔI/I of the dynamic imbalance amount ΔI to the moment of inertia I is controlled to less than $(3.1 \times 10^7/(d_m \cdot N)^2) + 2.7 \times 10^{-5}$, then the moment of inertia about a specific axis will not become too large or too small compared to the moment of inertia about another axis, so that the likelihood of the rotation axis of the balls becoming fixed is minimal. In other words, the rolling faces of the balls 6 uniformly contact the inner ring raceway 2 and the outer ring raceway 4 (FIG. 2), even when the balls 6 rotate at high speed. As a result, the rolling face is less susceptible to damage, so that the reliability and life of the ball bearing 1 (FIGS. 1 and 2) is improved.

The present inventors assembled balls for which the ratio ΔI/I of the dynamic imbalance amount ΔI to the moment of inertia I had been obtained beforehand, into a ball bearing, and then gradually increased the rotational speed of the ball bearing, and measured the rotational speed N at which the rotation axis of the balls became fixed.

Figure 4:
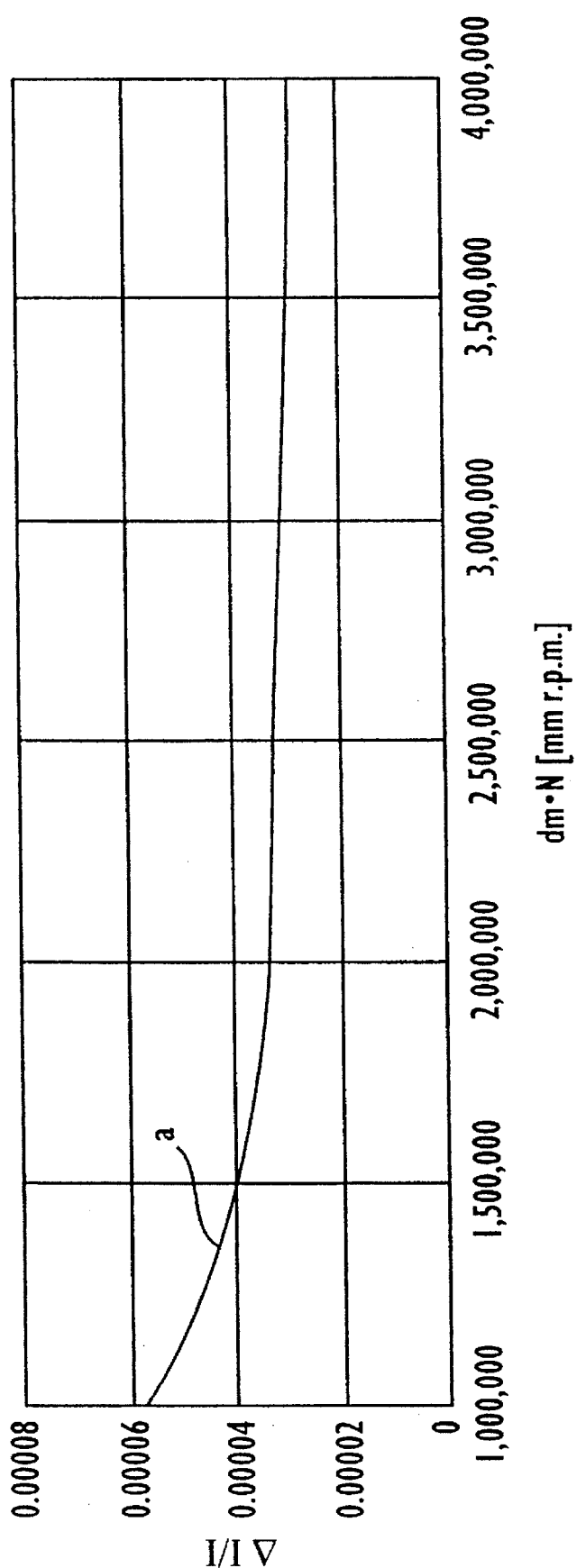
FIG. 4 is graph showing in relation to rotational speed, an influence that a ratio of imbalance amount to moment of inertia exerts on the rotation axis fixing of a ball.

The critical $d_m \cdot N$ where the rotation axis became fixed was then obtained from this rotational speed N and the already known pitch circle diameter $d_m$. FIG. 4 shows the results. The curve "a" in FIG. 4 represents the critical $d_m \cdot N$.

FIG. 4 shows for example a case where the rotation axis is fixed when the ratio ΔI/I is 0.00006 and $d_m \cdot N$ is a little less than 1,000,000 mm·rpm, and a case where the rotation axis is fixed when the ratio ΔI/I is 0.00004 and $d_m \cdot N$ is approximately 1,500,000 mm·rpm.

Consequently if a ball is selected so that at the maximum rotational speed ($d_m \cdot N$) under use, the ratio ΔI/I is below the curve "a" of FIG. 4, then the fixing of the rotation axis of the ball can be prevented, so that the reliability and life of the ball bearing 1 is improved.

The equation $(\Delta I/I \leq (3.1 \times 10^7/(d_m \cdot N)^2) + 2.7 \times 10^{-5})$ for limitation in the present invention in relation to the dynamic imbalance, approximately agrees with these experimental results.

To measure the dynamic imbalance amount ΔI, a method such as disclosed in Japanese Patent First Publication KOKAI No. S62-297740 can be adopted. With this method, a ball which is supported on a spherical surface bearing is rotated (about its own axis) by blowing with compressed air. The rotational speed, and the gyration period and angle of the precession produced with the rotation is then measured, and the dynamic imbalance amount ΔI computed from the measured values and the previously measure ball mass.

If the ball 6 has a static imbalance, then the moment of inertia about one axis will differ from that about the other axes, so that a dynamic imbalance will always be produced. Therefore by controlling the dynamic imbalance of the balls 6, the phenomena of the rotation axis of the balls 6 becoming fixed due to the static imbalance can also be prevented.

The ball bearings to which the present invention is addressed, are not limited to the construction wherein the inner ring 3 and outer ring 5 are provided independently, but also include ball bearings wherein the inner ring raceway is formed directly on the outer peripheral face of the shaft, or those wherein the outer ring raceway is formed directly on the inner peripheral face of a member other than the housing. Furthermore, the present invention may be applied to thrust bearings.

With the ball bearing of the present invention constructed and used as described above, the improvement in the reliability and life of ball bearings used with high speed rotating parts gives beneficial results such as a reduction in the time and labour involved with maintenance control of mechanical equipment incorporating high speed rotating parts.

What is claimed is:

1. A ball bearing comprising a first race ring having a first surface formed with a first race surface thereon, a second race ring having a second surface formed with a second race surface thereon, and a plurality of balls provided so as to be freely rotatable between the first race surface and the second race surface, each of the plurality of balls satisfying the numerical limitations that a ratio ΔI/I of a dynamic imbalance amount to a moment of inertia I, is less than $(3.1 \times 10^7/(d_m \cdot N)^2) + 2.7 \times 10^{-5}$, when the ball bearing is used under conditions wherein a product $d_m \cdot N$ of a pitch circle diameter $d_m$ mm of the plurality of balls, and a rotational speed N rpm of the second race ring relative to the first race ring is greater than 1,000,000 mm·rpm.

* * * * *